United States Patent
Yesildirek et al.

[11] Patent Number: 5,943,660
[45] Date of Patent: Aug. 24, 1999

[54] METHOD FOR FEEDBACK LINEARIZATION OF NEURAL NETWORKS AND NEURAL NETWORK INCORPORATING SAME

[75] Inventors: A. Yesildirek, Pocatello, Id.; F. L. Lewis, Ft Worth, Tex.

[73] Assignee: Board of Regents The University of Texas System, Austin, Tex.

[21] Appl. No.: 08/950,581

[22] Filed: Oct. 15, 1997

Related U.S. Application Data

[63] Continuation of application No. 08/496,493, Jun. 28, 1995, abandoned.

[51] Int. Cl.[6] .................................................. G06F 15/18
[52] U.S. Cl. ................................................ 706/10; 706/15
[58] Field of Search ............................... 395/11, 22, 903, 395/906, 23; 706/10, 15

[56] References Cited

U.S. PATENT DOCUMENTS

| | | | |
|---|---|---|---|
| 5,159,660 | 10/1992 | Lu et al. ................................. | 395/906 |
| 5,175,678 | 12/1992 | Frerichs et al. ........................ | 395/906 |
| 5,220,373 | 6/1993 | Kanaya .................................... | 395/906 |
| 5,282,261 | 1/1994 | Skeirik .................................... | 395/906 |
| 5,365,158 | 11/1994 | Tanaka et al. ........................... | 395/22 |
| 5,367,612 | 11/1994 | Bozich et al. .......................... | 395/903 |
| 5,388,186 | 2/1995 | Bose ....................................... | 395/903 |
| 5,396,415 | 3/1995 | Konar et al. ............................ | 395/903 |
| 5,448,681 | 9/1995 | Khan ...................................... | 395/906 |
| 5,471,381 | 11/1995 | Khan ...................................... | 395/906 |
| 5,498,943 | 3/1996 | Kimoto et al. ......................... | 395/23 |
| 5,513,097 | 4/1996 | Gramckow et al. ..................... | 395/903 |
| 5,559,690 | 9/1996 | Keeler et al. ........................... | 395/23 |
| 5,566,065 | 10/1996 | Hansen et al. .......................... | 395/906 |
| 5,566,275 | 10/1996 | Kano ....................................... | 395/23 |
| 5,677,609 | 10/1997 | Khan et al. ............................. | 395/11 |

OTHER PUBLICATIONS

Campion et al., "Indirect Adaptive State Feedback Control of Linearly Parametrized Non–Linear Systems," *Int. J. Control Signal Proc.*, 4:345–358 (1990).

Chen et al., "Adaptively Controlling Nonlinear Continuous–Time Systems Using Multilayer Neural Networks," *IEEE Trans. Automat. Control*, 39:1306–1310 (1994).

Hornik et al., "Multilayer Feedforward Networks are Universal Approximators," *Neural Networks*, 2:359–366 (1989).

Kanellakopoulos et al., "Systemic Design of Adaptive Controllers for Feedback Linearizable Systems," *IEEE Trans. Automat. Control*, 36:1241–1253 (1991).

Lewis et al., "Neural Net Robot Controller: Structure and Stability Proofs," *Proc. IEEE CDC*, San Antonio, 2785–2791 (1993).

Liu et al., "Adaptive Control of Non–Linear Continuous–Time Systems Using Neural Networks—General Relative Degree and MIMO Cases," *Int. J. Control.*, 58:317–335 (1993).

(List continued on next page.)

*Primary Examiner*—Tariq R. Hafiz
*Attorney, Agent, or Firm*—Arnold, White & Durkee

[57] ABSTRACT

A method for linearization of feedback in neural networks, and a neural network incorporating the feedback linearization method are presented. Control action is used to achieve tracking performance for a state-feedback linearizable, but unknown nonlinear control system. The control signal comprises a feedback linearization portion provided by neural networks, plus a robustifying portion that keep the control magnitude bounded. Proofs are provided to show that all of the signals in the closed-loop system are semi-globally uniformly ultimately bounded. This eliminates an off-line learning phase, and simplifies the initialization of neural network weights.

5 Claims, 8 Drawing Sheets

OTHER PUBLICATIONS

Marino et al., "Global Adaptively Output–Feedback Control of Nonlinear Systems, Part II: Nonlinear Parameterization," *IEEE Trans. Automat. Control*, 38:33–48 (1993).

Narendra et al., "A New Adaptation Law for Robust Adaptation Without Persistent Excitation," *IEEE Trans. Automat Control*, AC–32:134–145 (1987).

Narendra et al., "Identification and Control of Dynamical Systems Using Neural Networks," *IEEE Trans. Automat. Control*, 1:4–27 )1990).

Polycarpou et al., "Identification and Control of Nonlinear Systems Using Neural Network Models: Design and Stability Analysis," *Tech. Report 91–09–01, Dept. Elect. Eng. Sys., Univ. S. Cal.*, (1991).

Sastry et al., "Adaptive Control of Linearizable Systems," *IEEE Trans. Automat. Control*, 34:1123–1131 (1989).

Taylor et al., "Adaptive Regulation of Nonlinear Systems With Unmodeled Dynamics," *IEEE Trans. Automat. Control*, 34:405–412 (1989).

Loparo et al, "A New Approach for Adaptive Control of a Nonlinear System Using Neural Networks", 1990 IEEE Inter. Conf. on Systems Man and Cyber.

Lee et al, "Neural Network Control Systems Incorporating Parallel Adaptive Enhancements", 2nd IEEE Conference on Control Applications, Sep. 1993.

Teixeira et al, "Feedback Linearization of Unknown Nonlinear Systems Using Neural Networks—An Application to Motor Control", IEEE 1993 Interational Conference on Industrial Electronics, Control and Instrumentation.

Liguni et al, "A Regulator Design Using Multi–Layered Neural Networks," IEEE ICNN 1990.

Hokins et al, "Iferative Inversion of Neural and Its Application to Adaptive Control", IEEE Trans. on Neural Networks, 1992.

Jin et al, "Direct Adaptive Output Tracking Control Using Multilayered Neural Networks", IEEE Proceed. Part D of Control Theory App., 1993.

Yamada et al, "Remarks on an Adaptive Type Self–Tuning Control Using Neural Networks," IEEE Int. Conf. on Ind. Electronics, Control and Inst., 1991.

METHOD FOR FEEDBACK LINEARIZATION OF NEURAL NETWORKS AND NEURAL NETWORK INCORPORATING SAME

This application is a continuation of application Ser. No. 08/496,493, filed Jun. 28, 1995.

BACKGROUND OF THE INVENTION

In recent years, many solutions have been proposed for different problems from diverse fields using neural networks. The dynamical stability problem has not been so important in some neural network applications, such as classification, pattern recognition, combinatorial optimization, system identification, prediction, and the like. A simple gradient method using a non-increasing weight energy function is widely applied to these types of neural network applications for the purpose of learning the network weights. It is well known in the gradient type of optimization that the performance of the update rules varies according to the error surface of to be minimized. Depending upon the initialization method, those parameters may be stuck in local minima or result in an oscillatory behavior. Thus, a slow convergence is a very typical behavior in this method which typically does not cause problems in the above-identified applications for neural networks. However, such a method is not suitable for on-line feedback control applications.

In early neural network feedback control applications for dynamical systems, one of the most common neural network structures with a gradient descent method, known as the back propagation network, was used without concern for stability. Then, K. S. Narendra and K. Parthasarathy, "Identification and Control of Dynamical Systems Using Neural Networks," *IEEE Trans. Automat. Control*, 1, 4–27, 1990, showed that the convergence of such dynamical back propagation networks was naturally slow, but that stability of such networks could not be proven.

Off-line trained neural networks are generally not suitable for feedback control systems. Even after an obscure training phase, if a state vector, for some reason, goes outside of the compact region in which is it trained, further time-consuming training may be necessary. This situation is not so important for some open-loop applications (such as those mentioned above), though it may easily cause instability in dynamical feedback control systems. Thus, it is important to design a neural network controller which can learn on-line and adapt quickly to a changing environment, while preserving control stability.

There exists several on-line neural network controllers that are stable using a one-layer neural network (also known as a linear-in-the-parameters neural network). When linearity in the parameters holds, the rigorous results of adaptive control become applicable for the neural network weight tuning, and eventually result in a stable closed-loop system. However, the same is not true for a multilayer neural network, where the unknown parameters go through a nonlinear activation function. Such a multilayer neural network offers not only a more general case than the one-layer neural network, thus permitting applications to a much larger class of control systems, but also avoids some limitations, such as defining a basis function set or choosing some centers and variations of radial basis-type activation functions.

One proposed method to control a large class of nonlinear systems is to map nonlinear systems to linear systems. Controlling nonlinear systems by "feedback linearization" is presently focused around geometric techniques. However, applicability of these techniques is quite limited because these techniques rely on exact knowledge of the nonlinearities. In order to relax some of the exact model-matching restrictions, several adaptive schemes have been introduced that tolerate some linear parametric uncertainties. See for example, G. Campion and G. Bastin, "Indirect Adaptive State Feedback Control of Linearly Parameterized Nonlinear Systems," *Int. J. Control Signal Proc.*, vol. 4 (1990); D. G. Taylor et al., "Adaptive Regulation of Nonlinear Systems with Unmodeled Dynamics," *IEEE Trans. Automat. Control*, 34:405–412 (1989); R. Marino and P. Tomei, "Adaptive Output-Feedback Control of Nonlinear Systems, Part II: Nonlinear Parameterization," *IEEE Trans. Automat. Control*, vol. 38, (1993).

Unlike some open-loop neural network applications, in feedback control systems it must be shown that not only are the neural network weights bounded, but also that the inputs, outputs and states remain bounded. A general control structure for feedback linearization can be given by $$u = \frac{N(x)}{D(x)}.$$

When any adaptive scheme is employed to compute the denominator part of the controller with $\hat{D}(x,\hat{\Theta})$, then $\hat{D}$ must be bounded away from zero for all time. This type of controller will be referred to as a well-defined controller. This feedback linearization problem is far from trivial, and as a result, existing solutions to the control problem are usually given locally and/or assume additional prior knowledge about the system. The same difficulties appear in neural network control systems, which can be categorized as nonlinear adaptive systems.

SUMMARY OF THE INVENTION

The present invention provides a method for feedback linearization of a multi-level neural network and a multi-level neural network incorporating the linearization method. In particular, a controller structure is introduced which avoids the zero division problem in control signal computation, regardless of the neural network weight estimates. A stable multi-level neural network controller design is presented which relaxes some of the strong assumptions existing in the literature. By using a neural network-based controller, semi-global boundedness of all of the signals for a class of state-feedback linearizable systems is presented. In addition, by using a multilayer neural network in accordance with the present invention, which is not a linear-in-the-parameters network, no off-line learning phase is required, and the initialization of the neural network weights is straight forward.

In particular, the present invention presents a method of adaptively controlling a plant having at least one measurable output parameter, including the steps of, sensing at least one measurable output parameter of the plant, comparing the sensed output parameter with a desired state to produce an error signal, calculating, as a function of the sensed output parameter, a first control parameter using a first neural network process modeling a first nonlinear function, calculating, as a function of the sensed output parameter, a second control parameter using a second neural network process modeling a second nonlinear function, calculating a control action as a function of the error signal, and as a function of the first and second control parameters, and applying the control action to a control input of the plant to maintain the at least one measurable output parameter at the desired state.

The invention also contemplates the calculation of the control action proportional to the first control parameter, and inversely proportional to the second control parameter.

In order to ensure stability of control under all circumstances, the second control parameter may be compared with a predetermined threshold, and the control action may be robustified as a result of the comparison.

Prior to the step of calculating the control action, the error signal may be amplified as a function of weights of the first and second neural network processes. The weights of the first and second neural network processes may be adjusted as a function of the error signal.

The invention also contemplates an adaptive controller for a plant, comprising, means for sensing an output parameter of the plant, a first neural network, connected to the plant output, for calculating a first control parameter as a nonlinear function of the output parameter, a second neural network, connected to the plant output, for calculating a second control parameter as a nonlinear function of the output parameter, an error amplifier for calculating a difference between the plant output and a desired output, and means for calculating a control action as a function of the difference, and as a function of the first and second control parameters.

These and other features and advantages of the present invention will become apparent to those of ordinary skill in this technology with reference to the appended drawings and following detailed description.

DETAILED DESCRIPTION

1.0 Problem Statement
1.1 The Class of Nonlinear Systems

Consider a single-input single-output (SISO) state-feedback linearizable system having a state space representation in the controllability canonical form $$\dot{x}_1 = x_2 \quad (1.1)$$
$$\dot{x}_2 = x_3$$
$$\vdots$$
$$\dot{x}_n = f(x) + g(x)u + d$$
$$y = x_1$$

with $x=[x_1, x_2, \ldots, x_n]^T$, $d(t)$ the unknown disturbances with a known upper bound $b_d$, and $f,g: \mathbb{R}^n \to \mathbb{R}$ unknown smooth functions with $$|g(x)| \geq g > 0, \forall x \quad (1.2)$$

with $g$ a known lower bound. The assumption (1.2) on the smooth function g implies that g is strictly either positive or negative for all x. From now on, without losing generality, it is assumed that g is strictly positive. Note that at this point there is no general approach to analyze this class of unknown nonlinear systems. Adaptive control, for instance, needs an additional linear parameter in the parameters assumption.

Without any transformation, L-link rigid robots are in this class, with the exception that scalar $x_i$ is replaced by vector $x_i \in \mathbb{R}^L$, and g(x) is an invertible matrix for all x. The following development easily accommodates this extension.

Definitions

The solution of a dynamical system is semi-globally uniformly ultimately bounded (SGUUB) if for any compact set U of $\mathbb{R}^n$ and for all $x(t_0)=x_0 \in U$ there exists an $\epsilon > 0$ a number $T(\epsilon, x_0)$ such that $\|x(t)\| < \epsilon$ for all $t \geq t_0 + T$.

In the sequel $\|\cdot\|$ will indicate the Frobenius norm, unless otherwise mentioned. $(\hat{\cdot})$ and $(\tilde{\cdot})$ are used to denote the estimate and the estimate error of $(\cdot)\|$, respectively.

1.2 Tracking Problem

Feedback linearization is used to perform output tracking, whose objective can be described as: given a desired output, $y_d(t)$, find a control action, u, so that the plant follows the desired trajectory with an acceptable accuracy (i.e. bounded-error tracking), while all the states and controls remain bounded.

For this purpose some mild assumptions are made which are widely used. First a vector is defined as $$x_d(t) = [y_d, \dot{y}_d, \ldots, y_d^{(n-1)}]^T$$

It is assumed that the signal of g is known, and that the desired trajectory vector, $x_d(t)$ is assumed to be continuous, available for measurement, and $\|x_d(t)\| \leq Q$ with Q as known bound.

1.3 Error Dynamics

Define a state error vector as $$\tilde{e} = x - x_d \quad (1.3)$$

and a filtered error as $$r = \Lambda^T e \quad (1.4)$$

where $\Lambda = [\lambda_1, \lambda_2, \ldots, \lambda_{n-1}, 1]^T$ is an appropriately chosen coefficient vector so that $e \to 0$ exponentially as $r \to 0$, (i.e. $s^{n-1} + \lambda_{n-1} s^{n-2} + \ldots + \lambda_1$ is Hurwitz). Then the time derivative of the filtered error can be written as $$\dot{r} = f(x) + g(x)u + d + Y_d \quad (1.5)$$

where $$Y_d \equiv -x_d^{(n)} + \sum_{i=1}^{n-1} \lambda_i e_{i+1}$$

Note that $e_{i+1} = y^{(i)} - y_d^{(i)}$ for $i=1,2,\ldots,n-1$.

2.0 Neural Network Structure

Figure 1:
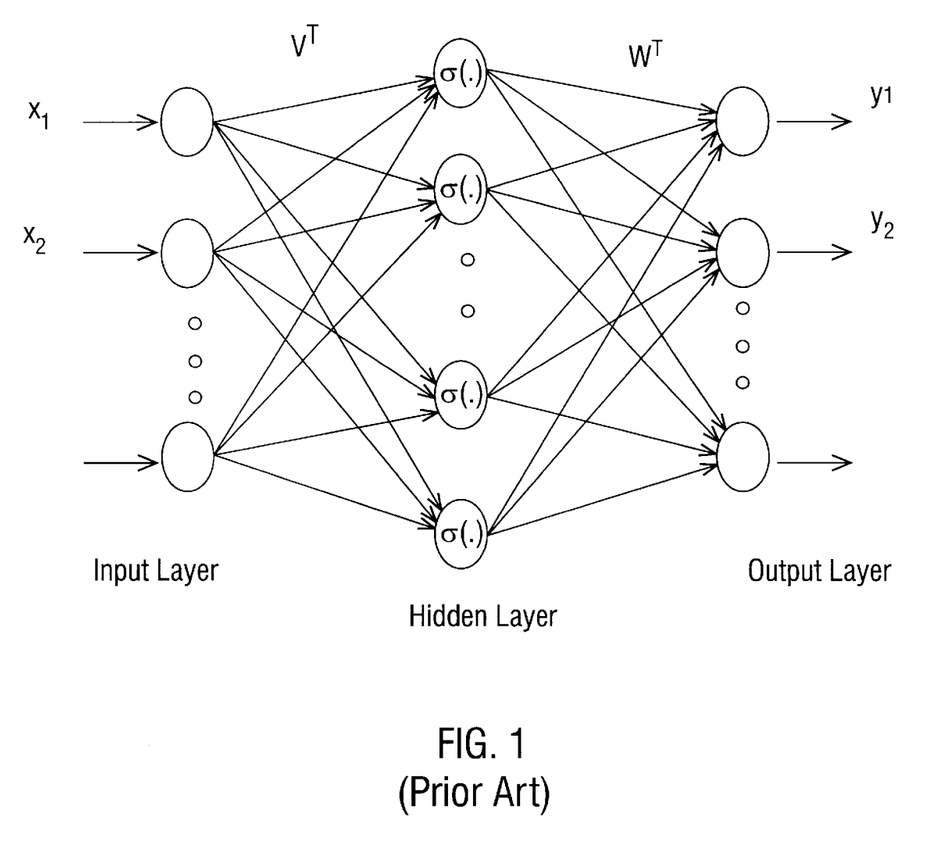
FIG. 1 is a prior art multilayer neural network.

Neural networks with a three-layer network structure are used for functional approximation in the controller of the present invention. such a net with input x and output h is shown in FIG. 1

$$h(x) = W^T \sigma(V^T x) \quad (2.1)$$

where $x \in U$, $W \in \mathbb{R}^{lh+1}$, $V \in \mathbb{R}^{(n+1) \times lh}$. The neural network thresholds are included in x and $\sigma$.

Depending on the activation function $\sigma(\cdot)$, (2.1) may or may not be dense in the space of continuous functions. The standard sigmoid functions are used in the hidden-layer neurons, so that $$\sigma_s(z) = \frac{1}{1+e^{-z}}, z \in IR$$

which is widely used in the literature. However the present invention is not limited to sigmoid function and support other commonly used smooth activation functions such as radial basis functions, or, the hyperbolic tangent.

For continuous functions, the approximation capability of the multilayer neural network has been proven by several researchers, e.g. K. Hornik et al., "Multilayer Feedforward Networks are Universal Approximators," *Neural Networks*, 2:359–366 (1989). Therefore, let $h(x)$ be a continuous function, then for any $\epsilon > 0$ there exists $W_h^*$, $V_h^*$ with the net dimension $l_h^*$ such that $$h(x) = W_h^{*T}\sigma(V_h^{*T}x) + \epsilon$$

However, in general, the required size of the neural net $l_h^*$ is not known for a given $\epsilon$, and use an estimated size $l_h$. In this case, given the size of the neural network, there exists $W_h$ and $V_h$ such that $$h(x) = W_h^T\sigma(V_h^T x) + \epsilon_{l_h}(x)$$

with $\epsilon_{l_h}(x)$ neural network reconstruction error. Note that $\epsilon_{l_h}(x)$ becomes smaller as the number of the neurons $l_h$ in the hidden layer increases.

Given $\sigma(x)$, $x_d(t) \in U_d \subset U$, and a sufficiently large number of hidden units $l_h$, the neural network reconstruction error is assumed to be bounded according to $$|\epsilon_{l_h}(x)| \leq \epsilon_h \forall x \in U \quad (2.2)$$

with $\epsilon_h$ a known bound in $x(t) \in U$.

Define $$\theta_h = \begin{bmatrix} V_h \\ W_h \end{bmatrix}$$

The matrix $\theta_h$ may be padded by zeros for dimensional consistency.

It is also assumed that the ideal neural network weights $W_h$ and $V_h$ are bounded by some known constant, or $$\|\Theta_h\| \leq \Theta_{hm} \quad (2.3)$$

with $\theta_{hm}$ a known bound.

Once the desired trajectory, the activation function, and the size of the neural network are set this bound reflects all the information needed to construct a stable controller. Equation (2.3) is a mild assumption in other current neural network literature such as F.-C. Chen and C.-C. Liu, "Adaptively Controlling Nonlinear Continuous-Time Systems Using Neural Networks," *IEEE Trans. Automat. Control*, 39:1306–1310 (1994), in which a local stability is assured only if the neural network weight estimates are close enough to the ideal ones. Moreover a bound on the norm of the unknown parameter matrix is usually required in most of the robust-adaptive control techniques, e.g. R. Marino and P. Tomei, "Adaptive Output-Feedback Control of Nonlinear Systems, Part II: Nonlinear Parameterization," *IEEE Trans. Automat. Control*, 38 (1993).

Since $h(x)$ is continuous in a compact set U, then there exist $C_3$ and $C_4$ such that $$|h(x)| = |W_h^T\sigma(V_h^T x) + \epsilon_{l_h}(x)| \leq C_3 + C_4|r| \forall x \in U \quad (2.4)$$

It is shown in F. L. Lewis et al., "Multilayer Neural Net robot Controller with Guaranteed Tracking Performance," *IEEE CDC, San Antonio*, 2785–2791 (1993) that for any continuous function $h(\cdot)$, the approximation error $$\tilde{h}(x) = h(x) - \hat{h}(x)$$

with the estimate $$\hat{h}(x) = \hat{W}_h^T\sigma(\hat{V}_h^T x)$$

can be written by using Taylor series expansion of $\sigma(V_h^T x)$ as $$\tilde{h}(x) = \tilde{W}_h^T(\hat{\sigma}_h - \hat{\sigma}_h' \hat{V}_h^T x) + \hat{W}_h^T \hat{\sigma}_h' \tilde{V}_h^T x + w_h \quad (2.5)$$

where $$\hat{\sigma}_h \equiv \sigma(\hat{V}_h^T x)$$

the Jacobian matrix is $$\left(\left(\hat{\sigma}_h' \equiv \frac{\partial \sigma_h(z)}{\partial z}\right)\right)_{z=\hat{z}}$$

and $$w_h(t) = \tilde{W}_h^T \hat{\sigma}_h' V_h^T x + W_h^T O(\tilde{V}_h^T x)^2 + \epsilon_{l_h}\bullet(x) \quad (2.6)$$

with $O(\tilde{V}_h^T x)^2$ higher order terms in the Taylor series expansion. A bound on $w_h$ is shown as $$|w_h(t)| \leq C_0 + C_1\|\Theta_h\|_F + C_2|r|\|\tilde{\Theta}_h\|_F \quad (2.7)$$

where $C_i$'s are computable constants.

3.0 Neural Network Controller

If the exact form of the nonlinear functions with no disturbances were known, then the control $$u = \frac{1}{g(x)}[-f(x) - K_v r - Y_d]$$

would bring the $r(t)$ to zero exponentially for any positive $K_v$. Since these functions are not exactly known, a control action is chosen $$u_c = \frac{1}{\hat{g}(\hat{\theta}_g, x)}[-\hat{f}(\hat{\theta}_f, x) + v] \quad (3.1)$$

where the estimates $\hat{f}(\hat{\theta}_f, x)$ and $\hat{g}(\hat{\theta}_g, x)$ are constructed by neural networks, and the auxiliary term is $$v = -K_v r - Y_d \quad (3.2)$$

with $K_v > 0$. It is well known, even in adaptive control of linear systems, that guaranteeing boundedness of $\hat{g}$ away from zero becomes an important issue in this type of controller, as discussed next.

3.1 Well-Defined Controller

In general, boundedness of $x$, $\hat{\theta}_f$ and $\hat{\theta}_g$ does not indicate the stability of the closed-loop system, because control law (3.1) is not well-defined when $\hat{g}(\hat{\theta}_g,x)=0$. Care must be taken to guarantee the boundedness of the controller, as well.

There are some techniques in the literature to assure that the control signal is well-defined for all time. A simple approach can be given for a small class of systems by setting the estimate $\hat{g}$ constant. This is not an accurate approximation that limits the class of systems and depending on the bounds may not give controllers that perform well.

For better performance, if g(x) is reconstructed by an adaptive scheme then a local solution can be given by assuming that initial estimates are close to the actual values and they do not leave a feasible invariant set in which $\hat{g}\neq 0$ C.-C. Liu and F.-C. Chen, "Adaptive Control of Non-linear Continuous Systems Using Neural Networks-General Relative Degree and MIMO Cases," *Int. J. Control*, 58:317–335 (1993), or lie inside a region of attraction of a stable equilibrium point which forms a feasible set as well I. Kanellakopoulos et al., "Systematic design of adaptive controllers for Feedback Linearizable Systems," *IEEE Trans. Automat. Control*, 36:1241–1253 (1991). Unfortunately, even with very good knowledge of the system it is not easy to pick initial weights so that the neural network approximates it.

Another way to keep $\hat{g}(\hat{\theta}_g,x)$ away from zero is to project $\hat{\theta}_g$ inside an estimated feasible region through the weight adaptation law M. M. Polycarpou and P. A. Ioannou, "Identification and Control Using Neural Network Models: Design and Stability Analysis," *Tech. Report* 91-09-01, Dept. Elect. Eng. Sys., Univ. S. Cal. (1991). A candidate set for this reason was shown as $B_\theta=\{\hat{\theta}_g: \hat{\theta}_{ij}>0\}\ \forall i,j$ with a gaussian or a sigmoidal type activation function guarantees that $|\hat{g}|\neq 0$. A shortcoming of this estimate region is that the actual $\theta_g$ does not necessarily belong to such a set, i.e. this is a suboptimal solution, in general.

The present invention takes into account this problem without such tight assumptions, gives a semi-global solution, and allows a simple method initializing the neural network weights.

To ensure the stability of the closed-loop system with a well-defined control input, the following control action is used $$u=\begin{cases} u_c+\frac{u_r-u_c}{2}\epsilon^{-\gamma(|u_c|-s)} & \text{If } I=1 \\ u_r+\frac{u_r-u_c}{2}\epsilon^{-\gamma(|u_c|-s)} & \text{If } I=0 \end{cases} \quad (3.3)$$

where s>0 is a design parameter, $\gamma<\ln 2/s$, and $u_c$ is as defined in (3.1) with the gain in (3.2) given by $$K_v=K_N+K_Z[(\|\hat{\Theta}_f\|+\Theta_{fm})+s(\|\hat{\Theta}_g\|+\Theta_{gm})] \quad (3.4)$$

with $K_N>0$ and $K_Z>\max\{C_2, C_4/s\gamma\in\Theta_{gm}\}$ design parameters. The known bounds $v_{im}$ for i=f,g are defined as in (2.3). The robustifying control term is $$u_r=-\mu\frac{|\hat{g}|}{\hat{g}}|u_c|sgn(r),\ \mu\geq 2, \quad (3.5)$$

and the indicator I is defined as $$I=\begin{cases} 1 & \text{If } \hat{g}\geq\underline{g} \text{ and } |u_c|\leq s \\ 0 & \text{o.w.} \end{cases}$$

Figure 2:
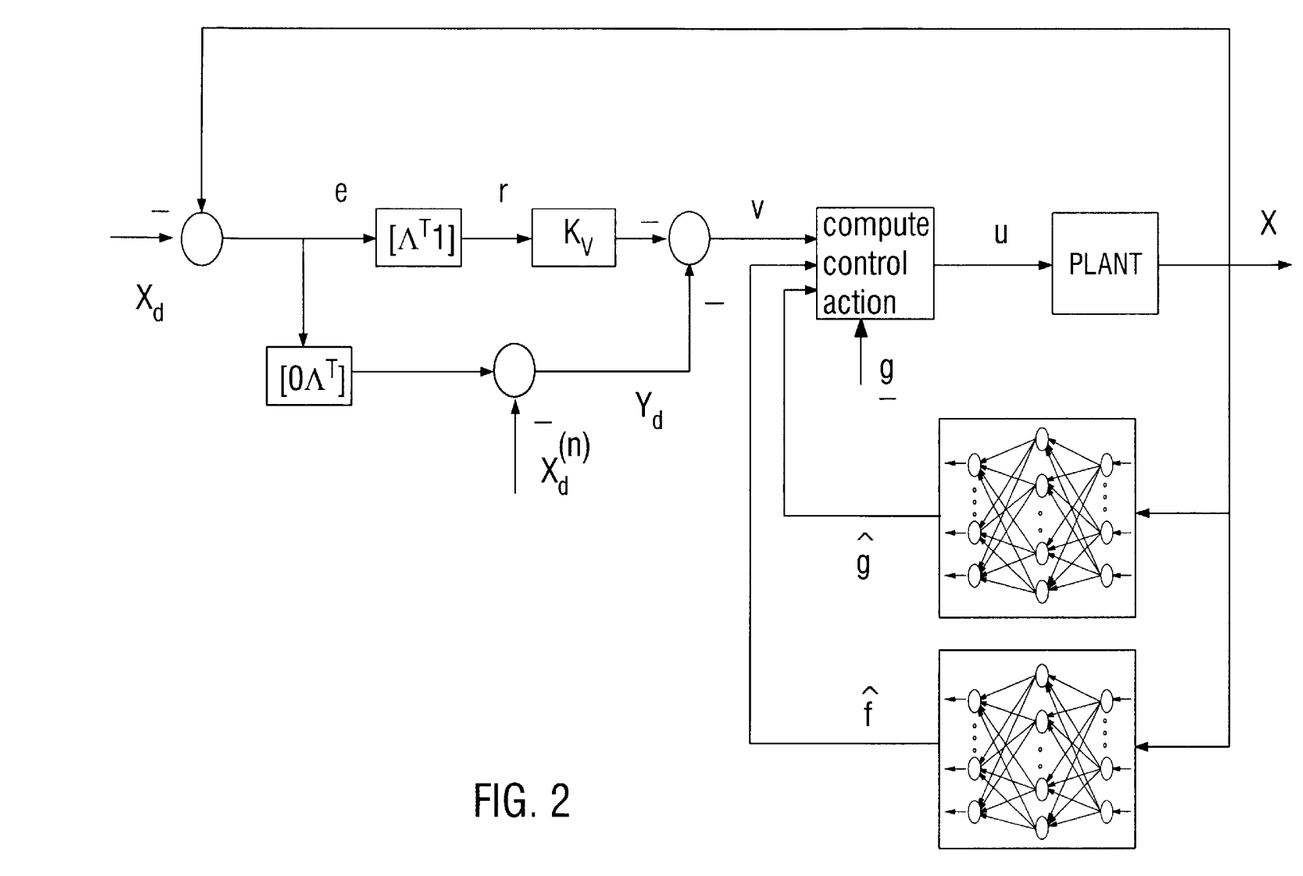
FIG. 2 is a neural network controller, incorporating feedback linearization, in accordance with the present invention.

It is important to note that if r(t), $\theta_i(t)$ are bounded, then u(t) is well-defined, even in the I=0 region. Therefore, $\hat{g}\rightarrow 0$ will not generate an unbounded control signal. FIG. 2 presents a block diagram of the controller of the present invention that performs the control method depicted by equations 3.3–3.5.

4.0 Stability Analysis

Let the neural networks used to approximate the continuous function f(x) be $$\hat{f}(x)=\hat{W}_f^T\sigma(\hat{V}_f^T x)$$

with weight update rule provided by $$\dot{\hat{W}}_f = M_f(\hat{\sigma}_f - \hat{\sigma}'_f\hat{V}_f^T x)r - \kappa|r|M_f\hat{W}_f \quad (4.1)$$

$$\dot{\hat{V}}_f = N_f r x\hat{W}_f^T\hat{\sigma}'_f - \kappa|r|N_f\hat{V}_f$$

and the neural network for g(x) be $$\hat{g}(x)=\hat{W}_g^T\sigma(\hat{V}_g^T x)$$

with weight update rule provided by $$\dot{\hat{W}}_g = \begin{cases} M_g[(\hat{\sigma}_g - \hat{\sigma}'_g\hat{V}_g^T x)u_c\tau - \kappa|\tau||u_c|\|\hat{W}_g|] & \text{if } I=1 \\ 0 & \text{O.W.} \end{cases} \quad (4.2)$$

$$\dot{\hat{V}}_g = \begin{cases} N_g u_c \tau x\hat{W}_g^T\hat{\sigma}'_g - \kappa|\tau||u_c|N_g\hat{V}_g & \text{if } I=1 \\ 0 & \text{O.W.} \end{cases}$$

where $M_i$ and $N_i$, i=f,g are positive definite matrices. It is important for the existence of solutions to the closed-loop system to note that $\hat{\theta}_g(t)$ is continuous.

If the feedback linearizable system has a representation in the controllability canonical form as in (1.1) and control input given by (3.3), the neural net weights are updated by (4.1) and (4.2), then the filtered tracking error r(t), neural net weight errors $\tilde{\theta}_{f,g}(t)$ and control input are SGUUB with specific bounds given in (4.13). Moreover the filtered tracking error r(t) can be made arbitrarily small by increasing the gain $K_N$.

Proof: Let the Lyapunov function candidate be $$L=\frac{1}{2}r^2+\frac{1}{2}tr\left\{\sum_{i=f,g}\tilde{W}_i^T M_i^{-1}\tilde{W}_i\right\}+\frac{1}{2}tr\left\{\sum_{i=f,g}\tilde{V}_i^T N_i^{-1}\tilde{V}_i\right\} \quad (4.3)$$

The derivatives of (4.3) are studied in two mutually exclusive and exhaustive regions.

Region 1: $|\hat{g}|\geq\underline{g}$ and $|u_c|\leq s$.

v—v is added into the error system dynamics (1.5) as $$\dot{r}=-K_v r+(f-\hat{f})+(g-\hat{g})u_c+d+gu_d$$

where $u_d$=u−uc. Substitution of the functional approximation errors as shown in (2.5) into the error system dynamics for $\tilde{f}$ and $\tilde{g}$ yields the form of the error dynamics $$\dot{r}=-K_v r+\tilde{W}_f^T(\hat{\sigma}_f-\hat{\sigma}'_f\hat{V}_f^T x)+\hat{W}_f^T\hat{\sigma}'_f\tilde{V}_f^T x+d+w_f+$$

$$w_g u_c+gu_d+[\tilde{W}_g^T(\hat{\sigma}_g-\hat{\sigma}'_g\hat{V}_g^T x)+\hat{W}_g^T\hat{\sigma}'_g\tilde{V}_g^T x]u_c \quad (4.4)$$

Substitution of (4.4), the update rules (4.1) and (4.2) into the time derivative of (4.3) yield $$\dot{L}=-K_v r^2+r(d+w_f)+rw_g u_c+rgu_d+\kappa|r|tr\{\tilde{\Theta}_f^T\hat{\Theta}_f\}+\kappa|r||u_c|tr\{\tilde{\Theta}_g^T\hat{\Theta}_g\}$$

Using $tr\{\theta^T\theta\}=<\theta^T,\theta>-tr\{\theta^T\theta\}\leq\|\theta\|(\theta_m-\|\theta\|)$, $K_z>C_2$, $|\hat{g}|>g$, and $\mu=2$ and substituting the upper bound of $w_f$ and $w_g$ according to (2.7) and $K_v$ from (3.4) the final form can be written by completing the squares $$\dot{L}\leq-|r|\{K_N|r|+\kappa(\|\tilde{\Theta}_f\|-C_f)^2+\kappa|u_c|(\|\tilde{\Theta}_g\|-C_g)^2-D_1\} \quad (4.5)$$

where $$D_1 \equiv b_d+(1+s)C_o+\kappa(C_f^2+sC_g^2)$$

and $$C_f \equiv \frac{\theta_{fm}}{2}+\frac{C_1}{2\kappa}, \quad C_g \equiv \frac{\theta_{gm}}{2}+\frac{C_1}{2\kappa}$$

The terms in braces in (4.5) defines a conic ellipsoid, a compact set around the origin of ($\|\tilde{\Theta}_f\|$, $\|\tilde{\Theta}_g\|$, r). Therefore, it can be deduced from (4.5) that, if $|r|>\delta_{r1}$ then $\dot{L}\leq 0$ for all $\|\tilde{\Theta}_f\|$ and $\|\tilde{\Theta}_g\|$ where $$\delta_{r1} = \frac{D_1}{K_N} \quad (4.6)$$

or, if $\|\tilde{\Theta}_f\|>\delta_{f1}$ then $\dot{L}\leq 0$ for all $\|r\|$ and $\|\tilde{\Theta}_g\|$ where $$\delta_{f1} = \frac{C_f}{2}+\sqrt{\frac{D_1}{\kappa}} \quad (4.7)$$

For the weights of $\hat{g}(x)$ an upper bound exists when $|u_c|\geq\epsilon_u>0$ as $$\delta_{g1} = \frac{C_g}{2}+\sqrt{\frac{D_1}{\epsilon_u\kappa}} \quad (4.8)$$

Observe that this bound becomes larger as $u_c\to 0$. Fortunately, integration of the update laws for $\hat{\theta}_g$ in $[t_0,t_0+T]$ can be written as $$\|\hat{\Theta}_g\|\leq\int_{t_0}^{t_0+T}\epsilon_u\beta_1\|\hat{\Theta}_g\|d\tau+\epsilon_u\beta_2T+\|\hat{\Theta}_g(t_o)\|$$

for some constants $\beta_1$, $\beta_2$. From the J.-J. E. Slotine and W. Li (1991), *Applied Nonlinear Control, New-Hersey*: Prentice-Hall, a constant upper bound is inferred $\|\tilde{\Theta}_g\|<\delta_{g2}$ with $$\delta_{g2}=(\epsilon_u\beta_2T+\|\hat{\Theta}_g(t_o)\|)e^{\epsilon_u\beta_2T}+\Theta_{gm} \quad (4.9)$$

With two valid bounds, one can establish a finite upper bound on $\|\tilde{\Theta}_g\|$ for all $|u_c|<s$ as $$\delta_g=\min\{\delta_{g1},\delta_{g2}\} \quad (4.10)$$

Figure 3:
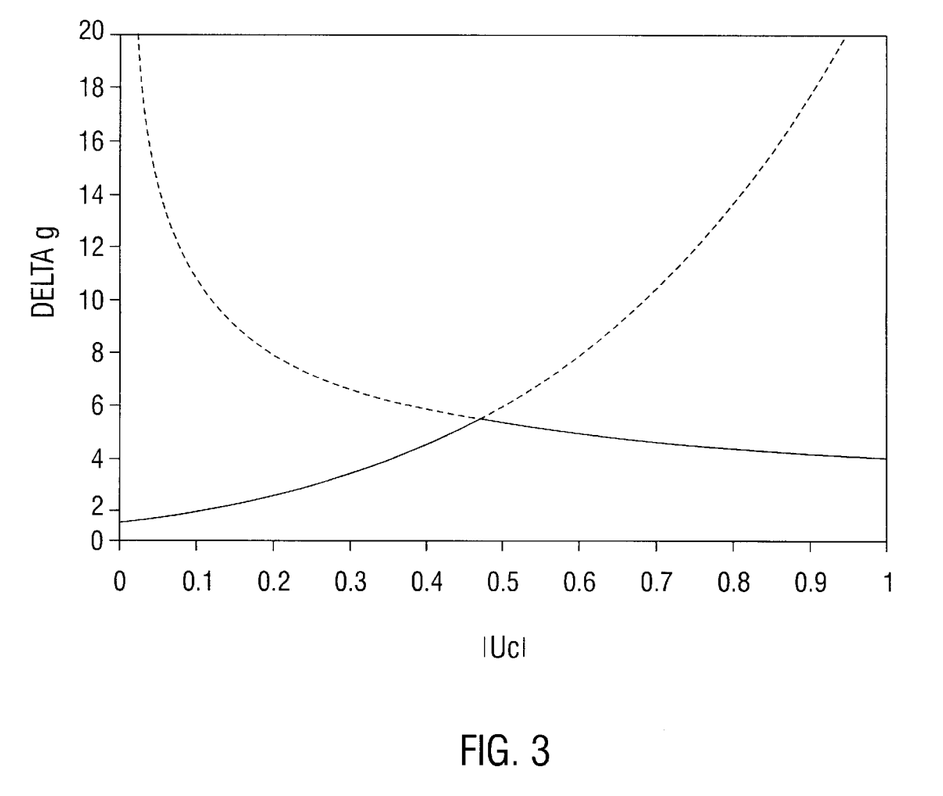
FIG. 3 is a graph illustrating the upper bound on $\|\hat{\theta}_g\|$.

The symbolic variation of these bounds with respect to $|u_c|$ is shown in FIG. 3. This shows the boundedness of r, $\theta_f$, $\theta_g$, $u_r$, and since $|u_c|\leq s$, this implies that $u\in L\infty$.

Region 2: $\hat{g}>g$ or $|u_c|>s$.
With the update rules corresponding to this region L becomes $$\dot{L}\leq-K_v r^2+r(d+w_f)+r\tilde{g}u_c+rgu_d+\kappa|r|\|\tilde{\Theta}_f\|(\Theta_f-\|\tilde{\Theta}_f\|) \quad (4.11)$$

Now define $$\dot{L}_g=r\tilde{g}u_c+rgu_d=-r\tilde{g}u_c+rgu$$

Substitution of the controller corresponding to this region yields $$\dot{L}_g = -r\tilde{g}u_c-rgu_r\left(1-\frac{1}{2}\epsilon^{-\gamma(|u_c|-s)}\right)+\frac{1}{2}rgu_c\epsilon^{-\gamma(|u_c|-s)}$$

If $|u_c|>s$, $$\dot{L}_g\leq\left|r\|g\|u_c\right|\left(1-\frac{\mu}{2}\frac{g}{\hat{g}}\right)+\frac{1}{2}|r||g||u_c|\epsilon^{-\gamma(|u_c|-s)}$$

Then using $\epsilon^{\delta s}\leq 2$ and (3.4) for $x\in U$ yield $$\dot{L}_g\leq|r|(C_3+C_4|r|)\frac{1}{\gamma\epsilon}$$

The other case occurs when $|u_c|<s$ and $|\hat{g}|<g$. This affects $\dot{L}_g$ as follows, $$\dot{L}_g\leq|r||g||u_c|+\frac{1}{2}rgu_c\epsilon^{-\gamma(|u_c|-s)}\leq|r|\left[gs+\frac{(C_3+C_4|r|)}{\gamma\epsilon}\right]$$

Therefore $$\dot{L}_g\leq\frac{|r|}{\gamma\epsilon}[\gamma\epsilon gs+C_3+C_4|r|]$$

in this region. Now pick $$K_z>\frac{C_4}{\gamma\epsilon s\theta_{gm}}$$

and substitute $\dot{L}$ into L to obtain $$\dot{L}\leq-|r|\{K_N|r|+\kappa(\|\tilde{\Theta}_f\|-C_f)^2-D_2\}$$

where the constant $D_2$ is $$D_2\equiv b_d+C_0+\kappa C_f^2+\frac{C_3}{\gamma\epsilon}+gs$$

Whenever $|r|>\delta_{r2}$ or $\|\tilde{\Theta}_f\|>\delta_{f2}\dot{L}\leq 0$ where $$\delta_{r2}=\frac{D_2}{K_N} \quad \delta_{f2}=\frac{C_f}{2}+\sqrt{\frac{D_2}{\kappa}} \quad (4.12)$$

This implies that x stays in a compact set so does g(x). This shows the boundedness of r, $\theta_f$ together with bounded $\theta_g$ implies that $u_r\in L\infty$. Combining the results from region one and two, one can readily set $$\delta_r=\max\{\delta_{r1},\delta_{r2}\}\delta_f=\max\{\delta_{f1},\delta_{f2}\}\delta_g=\min\{\delta_{g1},\delta_{g2}\} \quad (4.13)$$

Figure 4:
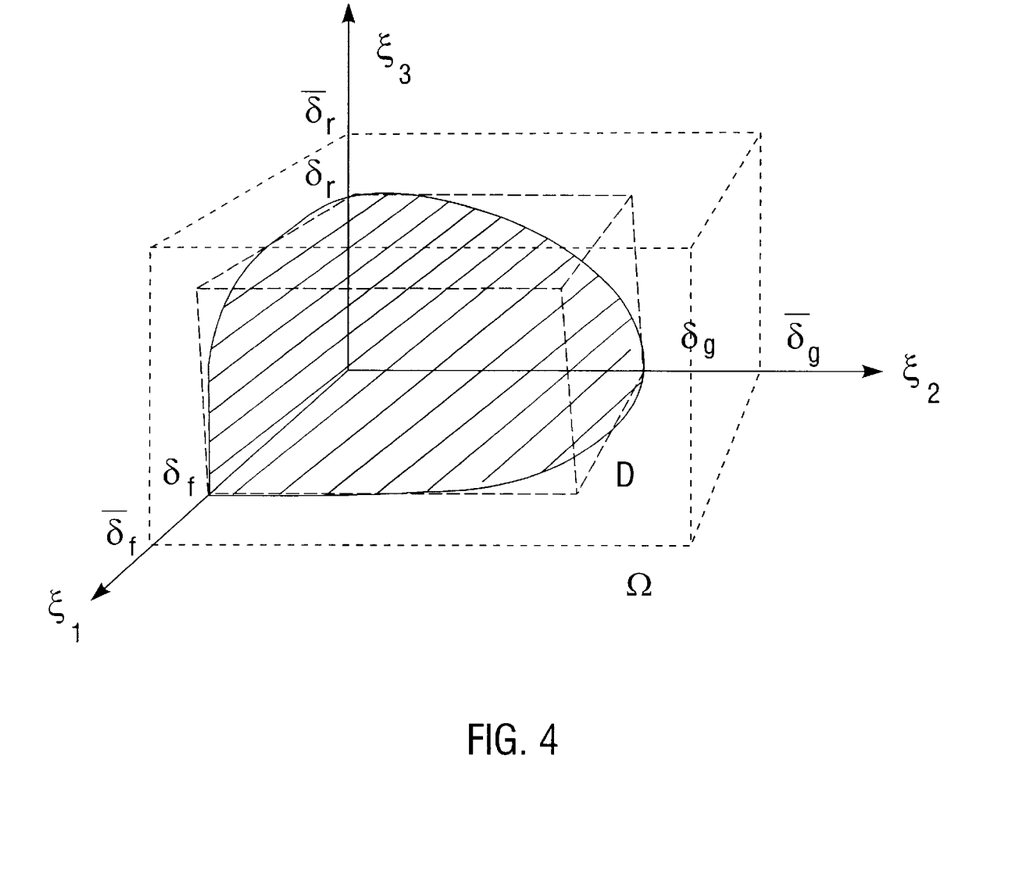
FIG. 4 is a three dimensional graph of the invariant set.

Thus for both regions, if $|r|>\delta_r$ or $\|\tilde{\Theta}_f\|>\delta_f$ or $\|\tilde{\Theta}_g\delta_g$, then $\dot{L}\leq 0$ and $u\in L\infty$. This defines a compact region about the origin of ($|r|$, $\|\tilde{\Theta}_f\|$, $\|\tilde{\Theta}_g\|$) outside of which $\dot{L}<0$, illustrated in FIG. 4. According to a standard Lyapunov extension, this demonstrates UUB in a compact set U. Since neural network approximation goes through any compact set, SGUUB is concluded.

For practical purposes, (4.13) can be considered as bounds in $|r|$, $\|\tilde{\Theta}_f\|$, and $\|\tilde{\Theta}_g\|$. Note that the bound on the tracking error may be kept arbitrarily small if the control gain $K_N$ is chosen big enough. The neural network construction errors $\epsilon_i$, the bounded disturbances, the norm of the desired performance and the neural networks sizes all embodied in the constants $C_j$ which contribute to definitions of $\delta_r$, $\delta_f$, and $\delta_g$. Note the role of the design parameter κ; the larger κ, the smaller the bound on parameter errors; and the larger the bound on the tracking error. If the switching parameter s is chosen too small, it will limit the control input and result in a large tracking error which gives undesirable closed-loop performance. If it is too large, the control actuator may saturate as u(t) increases in magnitude.

The adaptation laws are derived from the Lyapunov approach. It turns out that the first term in the adaptation laws has the same structure as a back propagation network with the filtered tracking error replacing the functional estimate error. Additionally, in the absence of PE and noise and/or unmodeled dynamics an extra e-modification K. S. Narendra and A. M. Annaswamy, 1987, A new adaptation law for robust adaptation without persistent excitation, *IERE Trans. Automat. Control*, AC-32:134–145, term may be added to gain some robustness. Moreover, another novel feedforward propagating term may be introduced to cancel out some of the higher order terms coming from the Taylor series expansion (Lewis et al., 1993, Multilayer Neural net robot controller with guaranteed tracking performance, *Proc. IEEE CDC, San Antonio*, 2785–2791.

Semi-global stability of the closed-loop system is shown without making any assumptions on the initial neuron network weight values. The neuron networks can easily be initialized as $\theta_f(0)=0$ and $\theta_g(0)>\hat{g}^{-1}(g)$. They are not required to be in the neighborhood of some ideal weights which are unknown even for known dynamical models. It is important to note that the neuron network need not to be trained before use in the closed-loop. No assumptions that being in an invariant set, or a region of attraction, or a feasible region is needed.

5. Simulation Examples

Example 1

Figure 5:
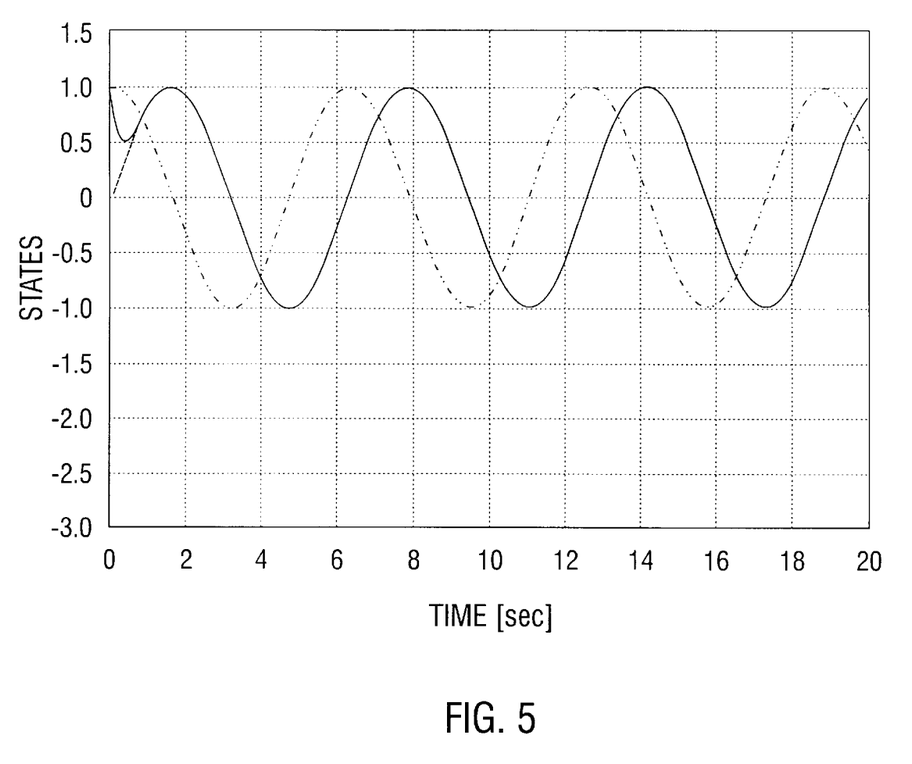
FIG. 5 is a graph of a simulation of actual and desired output states of a controller using the present invention.
Figure 6:
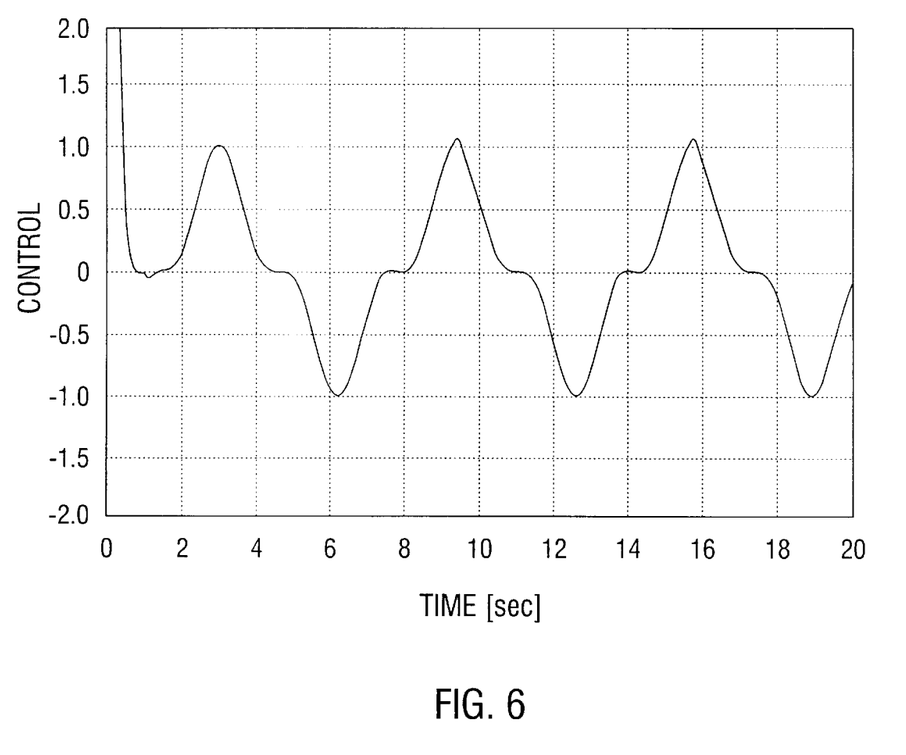
FIG. 6 is a graph of the control input used to produce the output states depicted in FIG. 5.

As an example consider a Van der pol's system $$\dot{x}_1 = x_2 \dot{x}_2 = (1-x_1^2)x_2 - x_1 + (1+x_1^2+x_2^2)u \quad (5.1)$$

which is in the controllability canonical form and g(x) $\geq 1 \forall x$. Neural nets which are used for $\hat{f}$ and $\hat{g}$ comprise 10 neurons. sgn(r) is approximated by a hyperbolic tangent function in simulations. Design parameters are set to s=10, δ=0.05, $K_N$=20, $\delta_1$=5, $M_i=N_i$=20, $\mu$=4 and the rest are set equal to 1. Initial conditions are $\theta_f(0)$=0 and $\theta_g(0)$=0.4 so that $\hat{g}(0)>1$ and $x_1(0)=x_2(0)=1$. Desired trajectory is defined as $y_d(t)$=sin t. Actual and desired outputs are shown in FIG. 5 and control action is shown in FIG. 6. Actual state $x_1$ is shown solid, desired state $x_{1d}$ is shown dashed, actual state $x_2$ is shown dotted, and desired state $x_{2d}$ is shown dashdot. Note that almost perfect tracking is obtained in less than one second.

Example 2

The Van der pol's system of Example 1 is changed so that it is ill-defined when $x_1(t)$=0

$$\dot{x}_1 = x_2 \dot{x}_2 = (1-x_1^2)x_2 - x_1 + x_1^2 u \quad (5.2)$$

Figure 7:
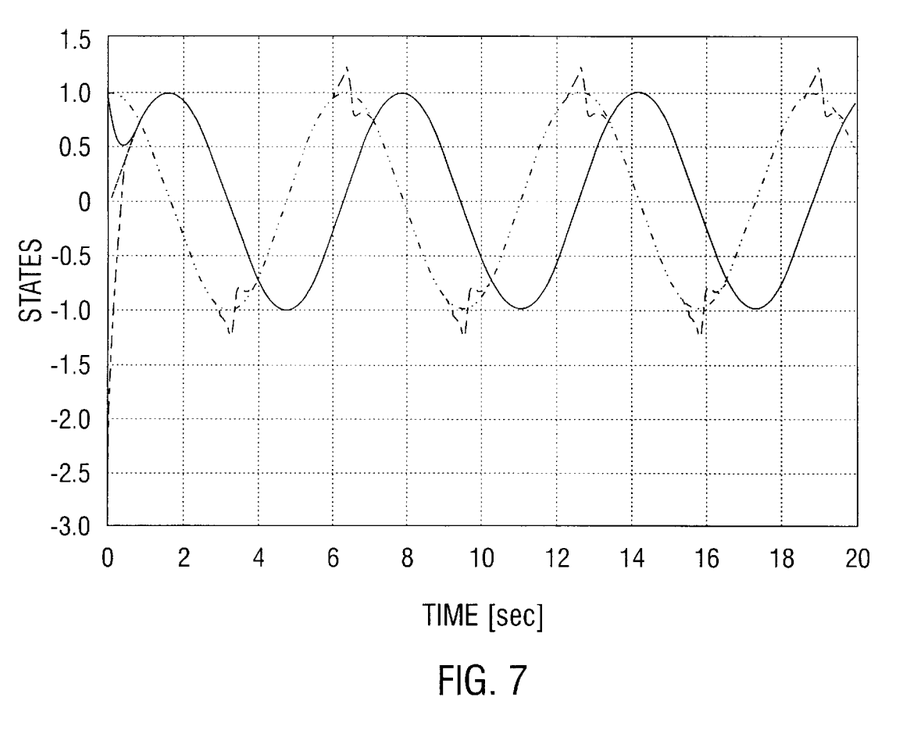
FIG. 7 is another graph of actual and desired output states of a controller employing the present invention.
Figure 8:
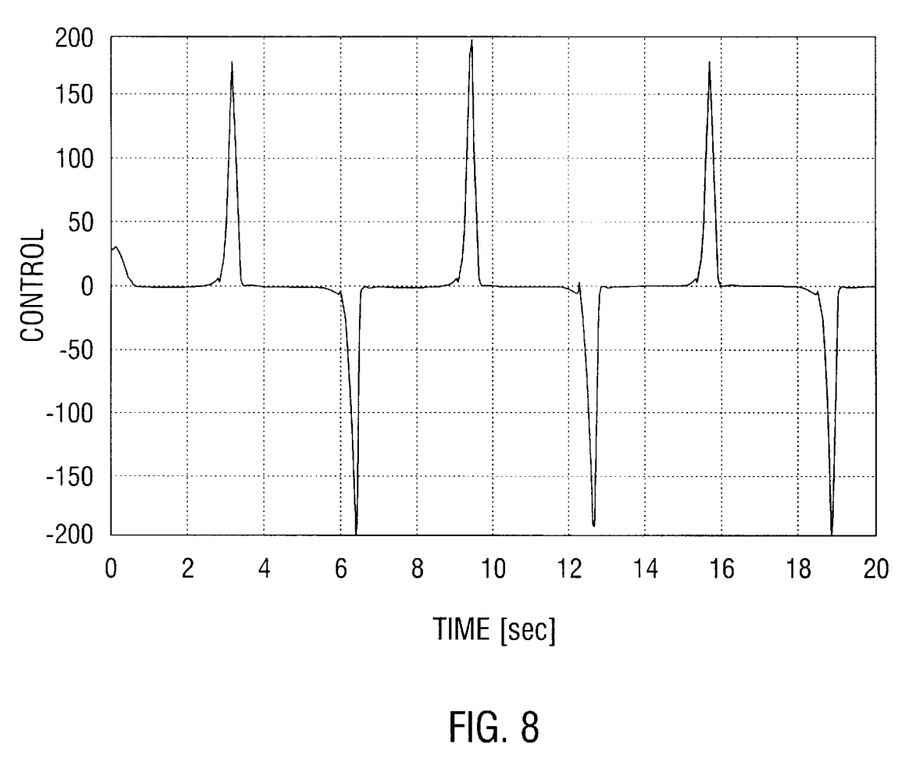
FIG. 8 is a graph of the control input used to produce the output states depicted in FIG. 7.

Pick the same neural network controller parameters as in example 1. Although g(x) is not bounded away from zero, we set g=0.1. The objective is to show that the neuron network controller of the present invention can give good performance even with systems that are not well-defined in relative degree. Simulation results show the performance f the neural network in FIGS. 7 and 8. In FIG. 7, actual state $x_1$ is shown solid, desired state $x_{1d}$ is shown dashed, actual state $x_2$ is shown dotted, and desired state $x_{2d}$ is shown dashdot. Control action is shown in FIG. 8. Observe that around the singularity points (t=nπ for n= . . . , −1,0,1, . . . after tracking is satisfied) the controller needed to linearize the system reaches its peak which is set by the design parameters g and s. That is when $^y$>>s then u→$u_r$ which is proportional to $g^{-1}$. This conflict forms a trade-off between a good output tracking and limited control actuator. By choosing a lower bound on g and s, the amount of the control and tracking error are decided.

REFERENCES

The following references, to the extent that they provide exemplary procedural or other details supplementary to those set forth herein, are expressly incorporated herein by reference.

G. Campion and G. Bastin, "Indirect Adaptive State Feedback Control of Linearly Parameterized Nonlinear Systems," *Int. J. Control Signal Proc.*, vol. 4.

F.-C. Chen and C.-C. Liu, "Adaptively Controlling Nonlinear Continuous-Time Systems Using Neural Networks," *IEEE Trans. Automat. Control*, 39:1306–1310 (1994).

K. Hornik et al., "Multilayer Feedforward Networks are Universal Approximators," *Neural Networks*, 2:359–366 (1989).

A. Isidori, *Nonlinear Control Systems*, New York, Springer-Verlag (1989).

I. Kanellakopoulos et al., "Systematic Design of Adaptive Controllers for Feedback Linearizable Systems," *IEEE Trans. Automat. Control*, 36:1241–1253 (1991).

F. L. Lewis et al., "Multilayer Neural Net Robot Controller With Guaranteed Tracking Performance," *Proc. IEEE CDC, San Antonio*, 2785–2791 (1993).

C.-C. Liu and F.-C. Chen, "Adaptive Control of Non-Linear Continuous Systems Using Neural Networks-General Relative Degree and MIMO Cases," *Int. J. Control*, 58:317–335 (1993).

R. Marino and P. Tomei, "Adaptive Output-Feedback Control of Nonlinear Systems, Part II: Nonlinear Parameterization," *IEEE Trans. Automat. Control*, 38 (1993).

K. S. Narendra and A. M. Annaswamy, "A New Adaptation Law for Robust Adaptation Without Persistent Excitation," *IEEE Trans. Automat Control*, AC-32:134–145 (1987).

K. S. Narendra and K. Parthasarathy, "Identification and Control of Dynamical Systems Using Neural Networks," *IEEE Trans. Automat. Control*, 1:4–27 (1990).

M. M. Polycarpou and P. A. Ioannou, "Identification and Control Using Neural Network Models: Design and Stability Analysis," *Tech. Report* 91-09-01, Dept. Elect. Eng. Sys., Univ. S. Cal. (1991).

S.S. Sastry and A. Isidori, "Adaptive Control of Linearizable Systems," *IEEE Trans. Automat. Control*, 34:1123–1131 (1989).

J.-J.E. Slotine and W. Li, *Applied Nonlinear Control*, New Jersey: Prentice-Hall (1991).

D. G. Taylor et al., "Adaptive Regulation of Nonlinear Systems With Unmodeled Dynamics," *IEEE Trans. Automat. Control*, 34:405–412 (1989).

What is claimed is:

1. A method of adaptively controlling a plant having at least one measurable state and at least first and second unknown functions of said measurable state, comprising:

sensing said at least one measurable state;

comparing said sensed state with a desired state in a first feedback loop to produce an error signal;

calculating, as a function of said sensed state, a first unknown function estimate using a first multi-layer neural network process in a second feedback loop, said first multi-layer neural network process having multiple layers of neurons with tunable weights;

calculating, as a function of said sensed state, a second unknown function estimate using a second multi-layer neural network process in a third feedback loop, said second multi-layer neural network process having multiple layers of neurons with tunable weights;

calculating a smooth control action as a function of said error signal, and as a function of said first and second unknown function estimates;

applying said smooth control action to said plant to maintain said at least one measurable state at said desired state; and adaptively adjusting said tunable weights of said first and second multi-layer neural network processes as a function of said error signal.

2. The method of claim 1, said step of calculating said smooth control action comprising, calculating said control action proportional to said first unknown function estimate, and inversely proportional to said second unknown function estimate.

3. The method of claim 1, further comprising:

comparing said second unknown function estimate with a predetermined threshold; and robustifying said control action with a smooth correction term as a result of said comparison.

4. The method of claim 1, said step of adaptively adjusting weights of said first and second two-layer neural network processes, comprising:

on-line initialization of both the first and second multi-layer neural network tunable weights, eliminating the need for conducting a preliminary off-line open-loop learning mode to adjust the tunable weights of the neural networks;

simultaneous on-line adjustment of both the first and second multi-layer neural network tunable weights and tracking error control; and adjusting all layers of neural network tunable weights of said first and second network processes as a function of said error signal.

5. An adaptive controller for a plant including at least one measurable state and at least first and second unknown functions of said measurable state, comprising:

means for sensing said at least one measurable state of said plant;

a first multi-layer neural network having multiple layers of neurons with tunable weights, for receiving said at least one measurable state of said plant, for calculating a first unknown function estimate based on said at least one measurable state;

a second multi-layer neural network having multiple layers of neurons with tunable weights, for receiving said at least one measurable state of said plant, for calculating a second unknown function estimate based on said at least one measurable state;

an error amplifier for calculating a difference between said at least one measurable state and a desired state;

means for calculating a smooth control action as a function of said difference, and as a function of said first and second unknown function estimates, and for applying said control action to said plant; and means for adaptively adjusting said tunable weights of said first and second multi-layer neural networks as a function of said difference.

* * * * *